(12) United States Patent
Wada (10) Patent No.: US 6,781,708 B1
(45) Date of Patent: Aug. 24, 2004

(54) PRINTING APPARATUS, PRINT CONTROL METHOD AND PRINTING SYSTEM THEREFOR AND STORAGE MEDIUM

(75) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 09/662,132

(22) Filed: Sep. 14, 2000

(30) Foreign Application Priority Data

Sep. 20, 1999 (JP) .......................................... 11-266290

(51) Int. Cl.[7] .............................................. G06F 15/00
(52) U.S. Cl. ........................... 358/1.12; 358/296; 700/2
(58) Field of Search .............................. 358/1.12, 296, 358/300, 302, 400, 408; 399/405, 362, 367, 82; 700/2, 213; 355/478

(56) References Cited

U.S. PATENT DOCUMENTS 5,724,641 A * 3/1998 Shojo et al. ................. 399/410

6,125,305 A    9/2000 Sugita et al. ............... 700/213

* cited by examiner

*Primary Examiner*—Twyler Lamb
(74) *Attorney, Agent, or Firm*—Fitzpatrick, Cella, Harper & Scinto (57) ABSTRACT

A printing apparatus having a plurality of discharge portions (bins) to which a printed sheet is discharged. Control information on the plurality of bins is stored as discharge portion control information, and a printed sheet printed by a printing unit in accordance with a print job inputted from a host computer, is discharged to a bin specified based on a discharge destination identifier included in the print job. At this time, if any bin corresponding to the designated discharge destination identifier does not exist, the discharge portion control information is referred to, then an unused bin is specified among the plurality of bins, and the printed sheet is discharged to the specified bin. Further, an identifier of the specified bin is notified to the host computer, so that a user of the host computer can acquire information of the bin to which the printed sheets as the result of printing is to be discharged, in advance.

20 Claims, 10 Drawing Sheets

| BIN IDENTIFIER | DISCHARGE DESTINATION IDENTIFIER | PRESENCE / ABSENCE OF SHEET | HOST COMPUTER IDENTIFIER | USER IDENTIFIER |
|---|---|---|---|---|
| 1 | suzuki | PRESENCE | 192.168.10.50 | suzuki |
| 2 | tanaka | PRESENCE | 192.168.10.52 | tanaka |
| 3 | ABSENCE | ABSENCE | ABSENCE | ABSENCE |
| 4 | ABSENCE | ABSENCE | ABSENCE | ABSENCE |
| 5 | ABSENCE | ABSENCE | ABSENCE | ABSENCE |
| 6 | ABSENCE | ABSENCE | ABSENCE | ABSENCE |
| 7 | ABSENCE | ABSENCE | ABSENCE | ABSENCE |

| BIN IDENTIFIER | DISCHARGE DESTINATION IDENTIFIER | PRESENCE/ ABSENCE OF SHEET | HOST COMPUTER IDENTIFIER | USER IDENTIFIER |
|---|---|---|---|---|
| 1 | suzuki | PRESENCE | 192.168.10.50 | suzuki |
| 2 | tanaka | PRESENCE | 192.168.10.52 | tanaka |
| 3 | sasaki | PRESENCE | 192.168.10.52 | sasaki |
| 4 | ABSENCE | ABSENCE | ABSENCE | ABSENCE |
| 5 | ABSENCE | ABSENCE | ABSENCE | ABSENCE |
| 6 | ABSENCE | ABSENCE | ABSENCE | ABSENCE |
| 7 | ABSENCE | ABSENCE | ABSENCE | ABSENCE |

| BIN IDENTIFIER 301 | DISCHARGE DESTINATION IDENTIFIER 302 | PRESENCE / ABSENCE OF SHEET 303 | HOST COMPUTER IDENTIFIER 304 | USER IDENTIFIER 305 |
|---|---|---|---|---|
| 1 | suzuki | PRESENCE | 192.168.10.50 | suzuki |
| 2 | tanaka | PRESENCE | 192.168.10.52 | tanaka |
| 3 | sasaki | PRESENCE | 192.168.10.51 | sasaki |
| 4 | takahashi | PRESENCE | 192.168.10.53 | takahashi |
| 5 | sugiyama | PRESENCE | 192.168.10.54 | sugiyama |
| 6 | satoh | PRESENCE | 192.168.10.55 | satoh |
| 7 | inoue | PRESENCE | 192.168.10.56 | inoue |

PRINTING APPARATUS, PRINT CONTROL METHOD AND PRINTING SYSTEM THEREFOR AND STORAGE MEDIUM

FIELD OF THE INVENTION

The present invention relates to a printing apparatus having plural discharge portions to which printed output is discharged, a print control method and a printing system for the printing apparatus.

BACKGROUND OF THE INVENTION

A printing apparatus having a plurality of discharge portions (bins), each of which can discharge and accumulate a plurality of printed sheets, is known. One of the methods to perform printing by this printing apparatus is called "mail box printing". According to the "mail box printing", in a case where plural users share one printing apparatus, the respective bins are reserved in advance for the respective user's exclusive use. A user causes the printing apparatus to discharge a printed sheet to the bin which has been set in advance for the user's exclusive use, such that the user can collect the printed sheets from the bin. In this printing apparatus, the respective bins have discharge portion names. Upon printing, a user specifies a bin having a discharge portion name to be used by, e.g., a print job, thereby the user causes the printing apparatus to discharge printed sheets to the specified bin.

In the conventional printing apparatuses of this type, however, even if the printing apparatus has plural bins as sheet discharge portions, the names allotted to the bins are fixed. Accordingly, in a case where a bin is specified in printing by a print job, if the bin is used by another user, the print job with designation of the bin cannot be immediately accepted by the printing apparatus even though the printing apparatus has another available bin. In this case, the user has to wait until the print job by the other user is completed.

SUMMARY OF THE INVENTION

The present invention has been made in consideration of the above conventional art, and has its object to provide a printing apparatus, a print control method and a printing system, for being capable of dynamic management of discharge portions of printed mediums.

Further, another object of the present invention is to provide a printing apparatus, a print control method and a printing system, for specifying an unused discharge portion and discharge printed mediums if a discharge portion specified by a print job does not exist.

Further, another object of the present invention is to provide a printing apparatus, a print control method and a printing system, for discharging printed mediums, on which printing has been performed based on a print job based on an instruction of a user, to a predetermined discharge portion, and notify the user of the discharge portion.

According to the present invention, the foregoing objects are attained by providing a printing apparatus having a plurality of discharge portions to which a printed medium is discharged, the apparatus comprises: storage means for storing control information on the plurality of discharge portions; printing means for performing printing on a print medium in accordance with a print job; detection means for detecting whether a discharge portion designated by discharge destination specifying information included in the print job exist or not, on the basis of the control information stored in said storage means, wherein the discharge destination specifying information specifies a discharge portion to which a printed medium on which printing has been performed by said printing means is to be discharged; and control means for discharging the printed medium to the discharge portion detected by said detection means, while if said detection means has detected no discharge portion corresponding to the discharge destination specifying information, referring to the control information, specifying an unused discharge portion of the plurality of discharge portions, and discharging the printed medium to the specified discharge portion.

Further, the foregoing objects are attained by providing a printing system connecting an external device to a printing apparatus, wherein the printing apparatus comprises: a plurality of discharge portions to which a printed medium is discharged; storage means for storing control information on the plurality of discharge portions; printing means for performing printing on a print medium in accordance with a print job; detection means for detecting whether a discharge portion designated by discharge destination specifying information included in the print job exist or not, on the basis of the control information stored in said storage means, wherein the discharge destination specifying information specifies a discharge portion to which a printed medium on which printing has been performed by said printing means is to be discharged; control means for discharging a printed medium to a discharge portion detected by said detection means, while if said detection means has detected no discharge portion corresponding to the discharge destination specifying information, referring to the control information, specifying an unused discharge portion of the plurality of discharge portions, and discharging the printed medium to the specified discharge portion; and transmission means for transmitting specifying information to specify the discharge portion to which the printed medium has been discharged to the external device.

Further, the foregoing objects are attained by providing a print control method for controlling a printing apparatus having a plurality of discharge portions to discharge a printed medium, comprising the steps of: storing control information on the plurality of discharge portions in a memory; detecting whether a discharge portion designated by discharge destination specifying information included in the print job exist or not, on the basis of the control information stored in the memory, wherein the discharge destination specifying information specifies a discharge portion to which a printed medium on which printing has been performed is to be discharged; and discharging a printed medium to a discharge portion detected in said detecting step, while if no discharge portion corresponding to the discharge destination specifying information has been detected, referring to the control information, specifying an unused discharge portion of the plurality of discharge portions, and discharging the printed medium to the specified discharge portion.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
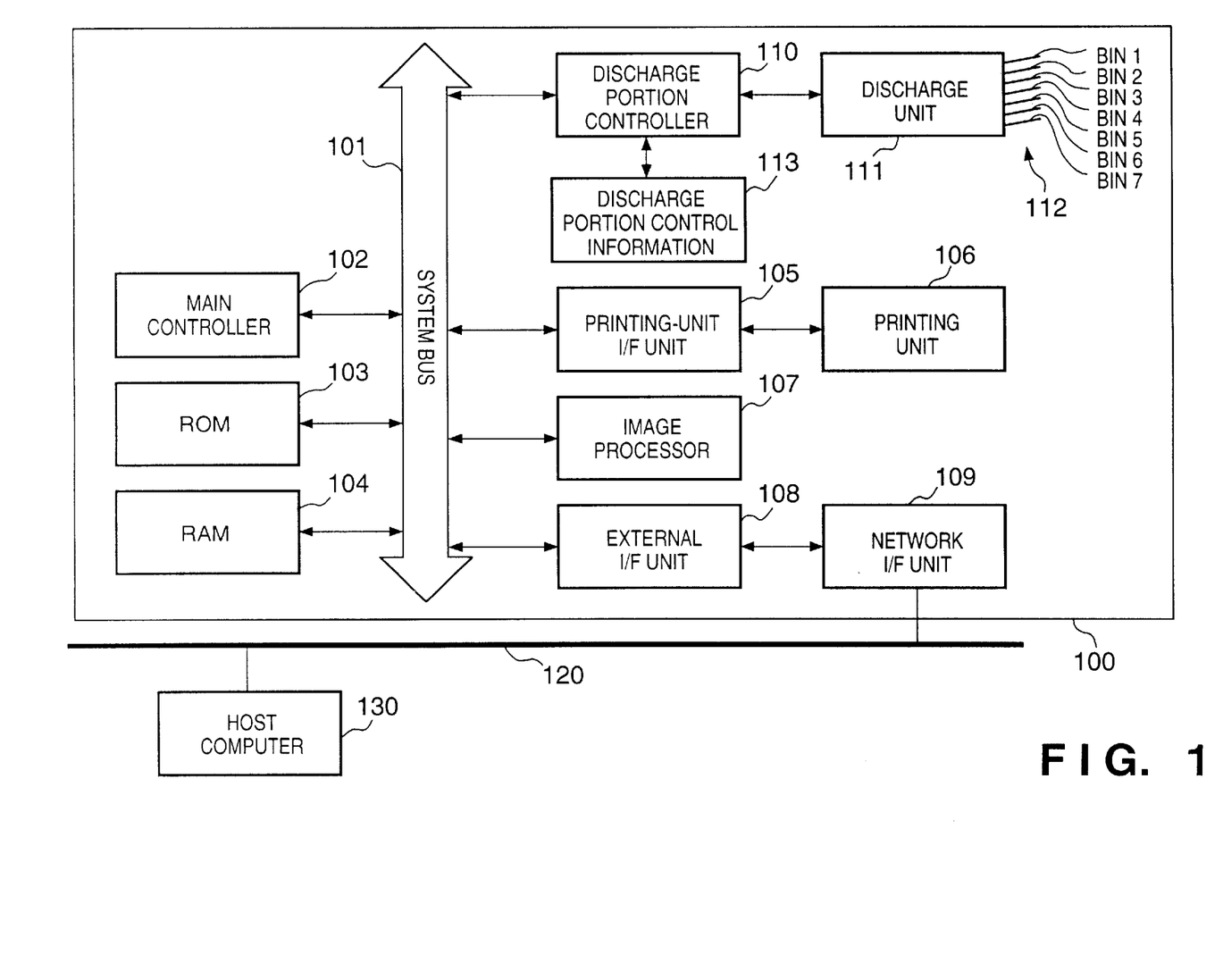
FIG. 1 is a block diagram showing the construction of a printing apparatus and a printing system according to a first embodiment of the present invention.

FIG. 1 is a block diagram showing the construction of a printing apparatus 100 according to a first embodiment of the present invention.

In FIG. 1, reference numeral 101 denotes a system bus, connecting a main controller 102 to the respective elements, for transmission of data and control signals therebetween. The main controller 102 controls the overall operation of the printing apparatus 100 in accordance with control programs stored in a ROM 103. The main controller 102 has a CPU such as a microprocessor. The operation program, various data and the like are stored in the ROM 103. Numeral 104 denotes a RAM in which image data processed by an image processor 107 and document data to be print-outputted by a printing unit 106 are stored. Further, the RAM 104 is used for storing data received from a host computer 130 via a network interface (I/F) unit 109, or used as a work area for temporarily storing various data upon control operation by the main controller 102.

Numeral 105 denotes a printing-unit interface (I/F) unit which controls interface with respect to the printing unit 106 as a printer engine. The I/F unit 105 controls interface with respect to the printing unit such as a laser printer having a so-called page print function to perform e.g. 1-page print-output. The image processor 107 enables print-output based on a print job or the like by the printing unit 106 by processing image data included in the print job.

Numeral 108 denotes an external interface (I/F) unit which performs interface control with respect to the network I/F unit 109. The network I/F unit 109 performs data communication control with respect to the host computer 130 via a network 120. Note that the external I/F unit 108 also has a function to perform communication with another host computer by serial or parallel communication other than the function to perform communication between the printing apparatus 100 and the host computer 130 via the network 120.

Numeral 110 denotes a discharge portion controller which performs discharge control upon discharge of printed sheets from the printing unit 106 to a discharge portion 112 (bins 1–7) of a discharge unit 111, in accordance with a discharge destination identifier 210 (FIG. 2) included in the print job, so as to discharge a printed sheet to the designated bin. Further, the discharge portion controller 110 manages discharge portion control information 113 as a management table holding control information corresponding to the respective bins.

Figure 2:
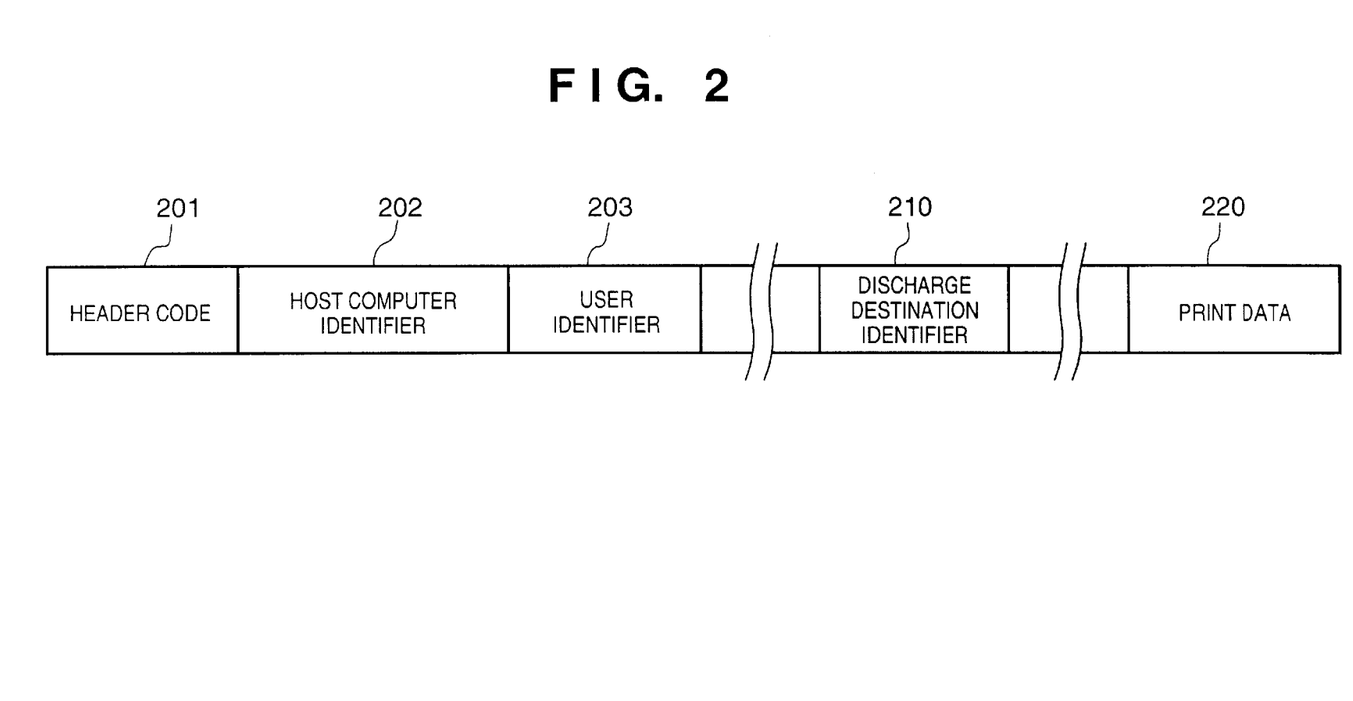
FIG. 2 is a schematic diagram showing the data format of print data included in a print job according to the first embodiment.

FIG. 2 shows a data format of a print job sent from the host computer 130 as an external device, to the printing apparatus 100.

In FIG. 2, numeral 201 denotes a header code indicating start of the print job; 202, a host computer identifier set to an identifier of the host computer that issued the print job; 203, a user identifier set to a user name of the host computer as an operator who issued the print job; 210, the discharge destination identifier specifying a discharge portion (bin) of the discharge unit 111 to which printed sheets from the printing unit 106 are discharged; and 220, print data including print instructions and data, such as a page description language data, and used in actual printing operation. The printing apparatus notifies a specific user exclusively using one of the bins of the discharge unit 111 of the discharge portion control information 113, by utilizing the host computer identifier 202 and the user identifier 203.

Figure 3:
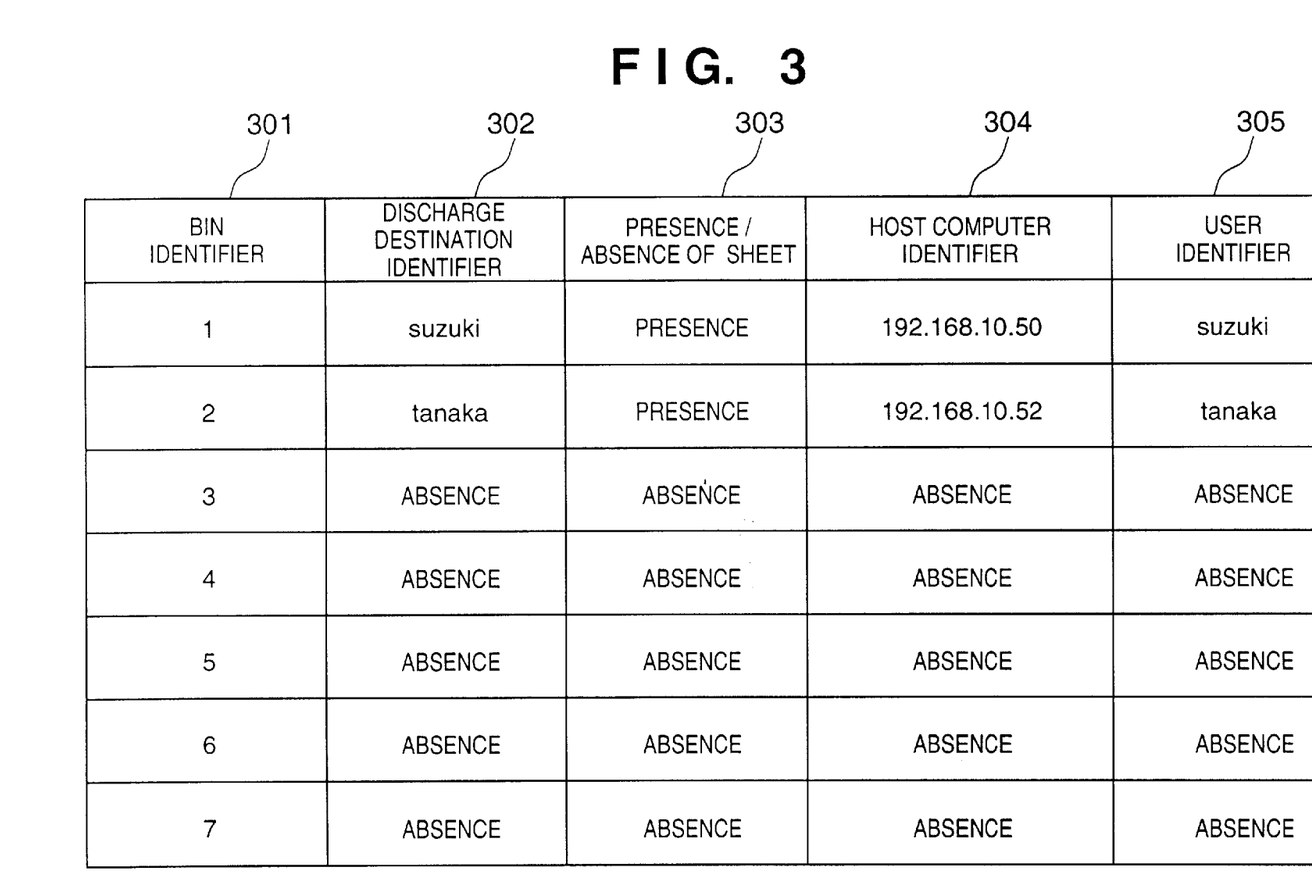
FIG. 3 shows a table showing an example of discharge portion control information according to the first embodiment.

The discharge portion control information 113 as shown in FIG. 3 is stored and managed as a management table for controlling discharge of printed sheets.

In FIG. 3, a bin identifier 301 indicates a bin number to identify each bin of the discharge portion 112. A discharge destination identifier 302 corresponds to the user identifier 203 set in correspondence with each bin (bin number). When a printed sheet by printing in accordance with a print job including the discharge destination identifier 210 (FIG. 2) is discharged, the discharge destination identifier 302 is utilized to determine a bin to which the printed sheet is discharged, based on the discharge destination identifier 210. The setting of the discharge destination identifier 302 will be described later with reference to FIG. 4. Numeral 303 denotes information of presence/absence of a sheet, i.e., whether or not printed sheet exists in each bin. As for a host computer identifier 304, the host computer identifier 202 included in the print job is registered. Further, as a user identifier 305, the user identifier 203 included in the print job is registered.

The discharge unit 111, having a plurality of bins 112, discharges printed sheets printed by the printing unit 106 to any one of the plurality of bins (1–7). The discharge portion controller 110 controls discharge of printed sheets from the printing unit 106 to one of the bins. The bins respectively have a sheet sensor to detect presence/absence of discharged printed sheet, and the presence/absence of printed sheet in each bin is stored as the discharge portion control information 113 via the discharge portion controller 110.

Next, the printed sheet discharge control by the printing apparatus 100 having the plurality of bins will be described with reference to FIGS. 1 to 3.

First, when a printing instruction is occurred by a user in the host computer 130, a print job is transmitted from the host computer 130 to the printing apparatus 100 via the network 120. Data of the transmitted print job is stored in the RAM 104. The main controller 102 performs various processing in accordance with programs stored in the ROM 103, and generates image information on respective image data (image objects) such as figures and characters by execution of image data processing on the data of the print job by the image processor 107. When all the image objects for one page have been generated, the main controller 102 maps the image information into a bitmap image data to be used in actual printing. The bitmapped image data is stored in the RAM 104.

Next, the discharge portion controller 110 determines one of the bins of the discharge unit 111, from which a printed sheet where the bitmapped image data is printed is to be discharged, on the basis of the discharge portion control information 113 and the discharge destination identifier 210 included in the transmitted print job. The printed sheet on which printing is performed based on the print job is discharged to the bin.

Thereafter, the bitmap image in the RAM 104 is sent via the printer I/F unit 105 to the printing unit 106, then printed on a print sheet, and the printed sheet is discharged via the discharge unit 111 to the specified bin.

Next, processing by the discharge portion controller 110 and the discharge portion control information 113 will be described in detail.

The discharge destination of printed sheet from the printing unit 106 is determined based on the discharge portion control information 113 stored under the management of the discharge portion controller 110.

FIG. 3 shows the discharge portion control information 113 according to the first embodiment.

As described above, the bin identifier 301 corresponds to each of the bins of the discharge unit 111, and the discharge destination identifier 302 indicates the discharge portion in correspondence to each print job, with respect to each bin. The information 303 of presence/absence of sheet indicates the presence/absence of sheet in a corresponding bin. The host computer identifier 304 is set based on the host computer identifier 202 included in a received print job, and is used to identify a host computer which has sent the print job. The user identifier 305 holds a user name of a user who exclusively uses a corresponding bin. Note that the information 303 of presence/absence of sheet is changed from "presence" to "absence" when all printed sheets in a corresponding bin have been removed, and the identifiers 302, and 304–305 of the discharge portion control information 113 corresponding to the bin are initialized. That is, in the example of FIG. 3, "suzuki" as the discharge destination identifier 302 is assigned to the bin 1, and "tanaka" as the discharge destination identifier 302, to the bin 2. Further, regarding bins 3 to 7, the information 303 of presence/absence of sheet is "absent" since no printed sheet is discharged to the bins 3–7, and the discharge destination identifier 302 and the user identifier 305 are not assigned to these bins 3–7. When, for example, the print job using the bin 1 has been completed and the information 303 of presence/absence of sheet corresponding to the bin 1 becomes "absent" by removing all printed sheets from the bin 1, the information 303 of the bin 1 becomes "absence" and the discharge destination identifier 302, the host computer identifier 304 and the user identifier 305 corresponding to the bin 1 are initialized to "none".

Next, the process of selecting a bin to which printed sheets are to be discharged will be described, on the assumption that "tanaka" is designated as the discharge destination identifier 210 of a print job, with reference to the flowchart of FIG. 4. Note that the control program for this processing is stored in the ROM 103 and is executed under the control of the main controller 102.

Figure 6:
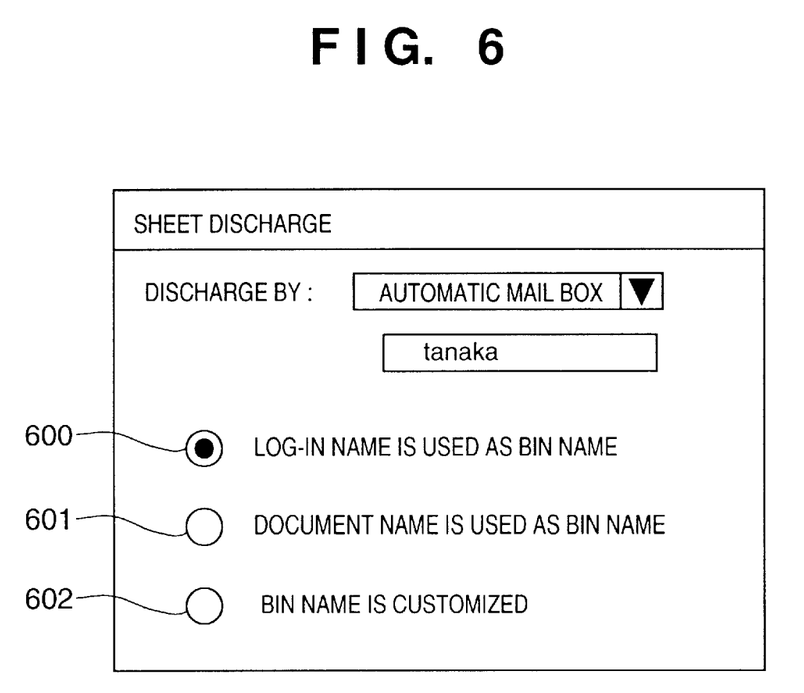
FIG. 6 is a diagram showing an example of image for setting a discharge destination identifier according to the first embodiment.

First, a print job generated by the host computer 130 is received in the format as shown in FIG. 2 via the network I/F unit 109. As the discharge destination identifier 210, "tanaka" is designated. The designation of "tanaka" as the discharge destination identifier 210 can be made, e.g., by setting a discharge destination bin name to "tanaka" in a printer-driver as shown in FIG. 6. In FIG. 6, "Log-in name is used as bin name" (600) is selected. Therefore, in this example, to specify the bins for the respective users, a printing executor identifier (user name) such as a log-in name to the host computer 130 is utilized as the discharge destination identifier 210.

Note that in the first embodiment, the discharge destination identifier 210 is set by using the printer driver. However, in a case where a print job is stored in the RAM 104 of the printing apparatus 100, the discharge destination identifier can be designated (changed) from the host computer 130 by using the discharge destination identifier 210 of the stored print job.

Hereinbelow, a description will be made with reference to the flowchart of FIG. 4. First, at step S401, bin selection processing is started, and at step S402, it is examined sequentially in order by bin number, whether or not there is a bin having the discharge destination identifier 302 corresponding to the discharge destination identifier 210 included in a received print job from a host computer, by referring to the discharge portion control information 113.

If a bin to which the corresponding discharge destination identifier is assigned is found by this search, the process proceeds to step S403, at which the bin is selected as the discharge portion for discharging sheets printed by the print job. In the example of FIGS. 3 and 6, the bin 2 corresponding to the discharge destination identifier "tanaka" is selected. Then at step S404, when printing processing by the printing unit 106 has been completed, the printed sheets are discharged to the bin (bin 2) selected at step S403. Next, the process proceeds to step S405, at which the information 303 of presence/absence of sheet corresponding to the bin (bin identifier: 2) in the discharge portion control information 113 is updated in accordance with discharge/removal of the printed sheet. Then at step S406, the bin number (bin identifier "2" in this case) of the bin to which the printed sheets have been discharged is notified to the user of the print job.

Figure 5:
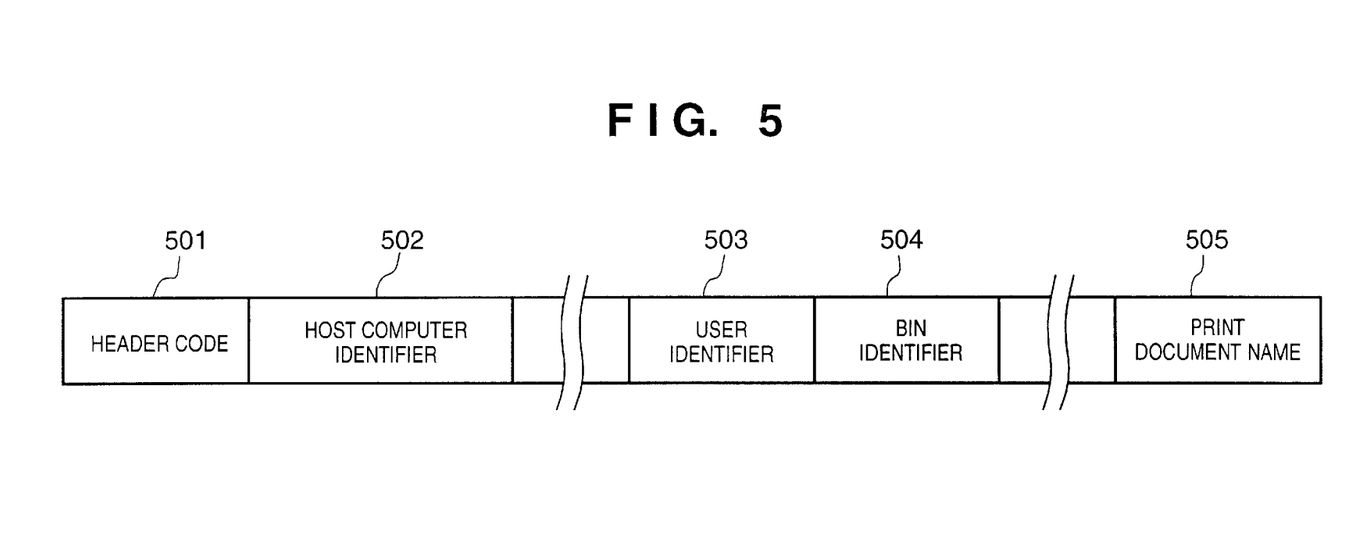
FIG. 5 is a schematic diagram showing the data format of transmission data to transmit a bin identifier from the printing apparatus according to the first embodiment to a host computer.

FIG. 5 shows a data format of the data to notify the bin identifier from the printing apparatus 100 to the host computer 130.

In FIG. 5, numeral 501 denotes a header code indicating that the data is a bin identifier notification message; 502, a host computer identifier to specify a host computer as a transmission destination of the information; 503, a user identifier corresponding to the user identifier 203 of a received print job; and 504, a bin identifier indicating the number of discharge portion (bin number) specified at step S403. In the above example, as the bin identifier 504, "2" indicating the bin 2 is set. Numeral 505 denotes a print document name corresponding to a print document name included in the print job received from the host computer.

Next, when the discharge portion control information 113 is as shown in FIG. 3, processing in a case where "sasaki" is designated as the discharge designation identifier 210 in a print job, will be described with reference to the flowchart of FIG. 4.

In this case, in the search processing at step S402, as no discharge destination identifier 302 corresponding to "sasaki" exits in the discharge portion control information 113 in FIG. 3, the process proceeds to step S408. At step S408, the information 303 of presence/absence of sheet stored in the discharge portion control information 113 is referred to, then the discharge portion control information 113 is updated by assigning a new discharge destination identifier to a bin with no sheet, i.e., available bin (e.g., bin 3). The process proceeds to step S409, at which the selected bin (bin 3) is set as the discharge portion for printed sheets by the print job. Then at steps S404–S406, processes similar to that as described above are performed. That is, at step S404, a printed sheet is discharged to the bin 3, and the information 303 of presence/absence of sheet in the discharge portion control information 113 is changed to "presence" (S405) from "absence". Further, the process proceeds to step S406, at which, the bin identifier "3" corresponding to the bin 3 used as the discharge portion is notified to the user by transmission of the bin notification data as shown in FIG. 5 to the host computer 130 (S406). Then the processing ends.

Figure 4:
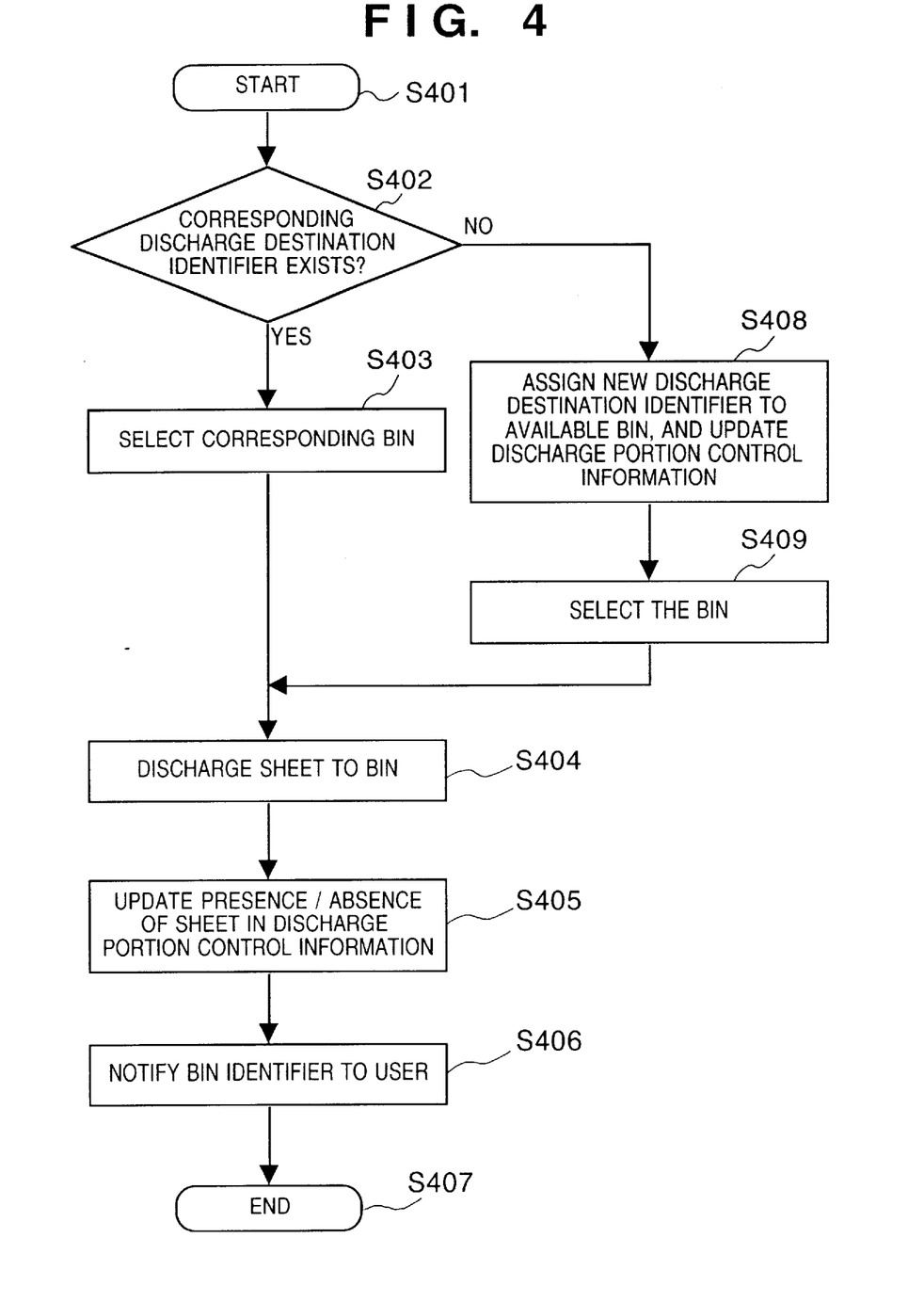
FIG. 4 is a flowchart showing a discharge portion selection procedure in the printing apparatus according to the first embodiment.
Figure 7:
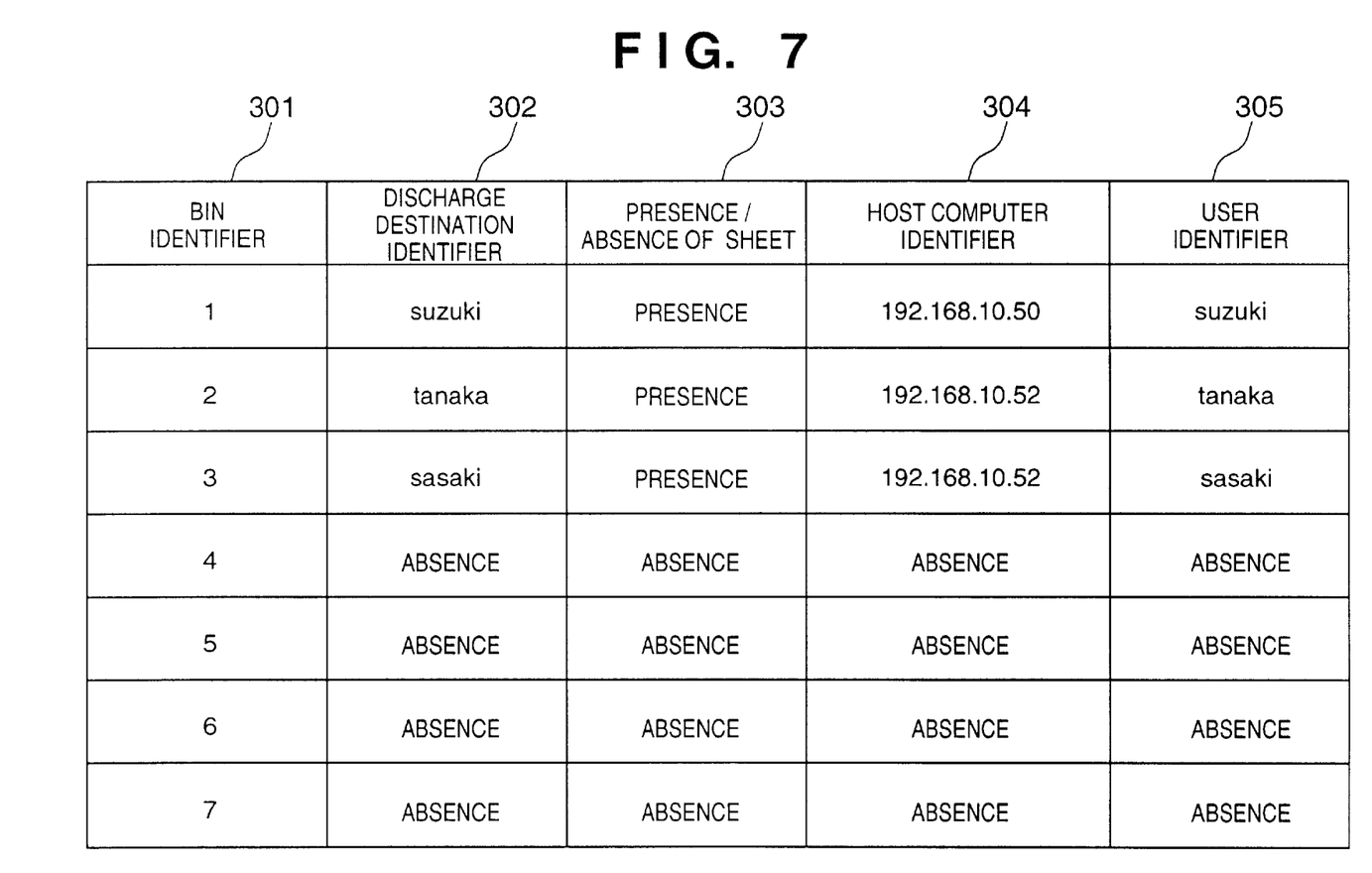
FIG. 7 is a diagram showing another example of the discharge portion control information according to the first embodiment.

FIG. 7 shows an example of the discharge portion control information 113 updated in the above-described processing at step S408 of FIG. 4.

In FIG. 7, the discharge destination identifier 302 of the bin 3 with "3" as the bin identifier 301 is changed to "sasaki", and the information 303 and the identifiers 304 and 305 related to the bin 3 are updated.

Further, as described above, if it is detected by the sheet sensor of each bin that a discharged printed sheet has been removed, the information of the corresponding bin identifier (bin number) of the discharge portion control information 113 is updated. Further, in a case where the statuses of use of the respective bins are as shown in FIG. 7, if all printed sheets in the bin 3 have been removed, the discharge portion control information 113 of the bin 3 is updated as shown in FIG. 3.

Note that in the above example, in the printing apparatus 100, when a printed sheet is discharged to a discharge portion (bin), the bin identifier (bin number) of the discharge portion is notified to the user, however, it may be arranged such that the host computer 130 acquires the discharge portion control information 113 from the printing apparatus so that the bin identifier (bin number) of the discharge portion is notified to the user by the host computer 130.

Further, as registering of the notification destination to notify the user of the bin identifier used to discharge a printed sheet, the host computer identifier 202 and the user identifier 203 included in a print job are referred to, however, it may be arranged such that apart from the print job, the host computer identifier 304 and the user identifier 305 are registered in the printing apparatus 100 in advance, and the registered identifiers are used as the notification destination.

As described above, according to the first embodiment, a discharge portion (bin) which is not occupied by another user is designated, and printed sheets are discharged to the designated bin.

Further, as each user can designate a bin for discharging printed sheets, even if plural users perform printing, printed sheets by print jobs of different users can be prevented from being mixedly discharged to one bin.

Second Embodiment

In the first embodiment, upon setting of the discharge destination identifier 210 of a print job, the printing executor identifier (the user name of host computer) is registered, thereby bins are assigned to respective printing executors (users), by way of utilization of mail box printing. Further, the identifier of print job may be registered as the discharge destination identifier 210 in the setting of the printer driver (FIG. 6). Note that in the second embodiment, the discharge destination identifier 210 is set through setting of the printer driver, however, in a case where a print job is stored in the RAM 104 of the printing apparatus 100, the discharge destination identifier may be designated (changed) from the host computer 130 by using the discharge destination identifier 210 in the header information of the print job.

That is, in FIG. 6, "log-in name is used as bin name" (600) is selected, however, "document name can be used as bin name" (601), for example, may be selected. In this case, a document name as an object of print job is registered as the discharge destination identifier to specify a bin to which printed sheets are to be discharged. Further, if "bin name is customized" (602) is selected, the discharge destination identifier to specify a bin to which printed sheets are to be discharged can be customized.

According to the second embodiment, as a bin to which printed sheets are to be discharged is specified for each print job, even in a case where printing operations are performed based on plural types of print jobs, printed sheets printed on the respective print jobs are discharged to corresponding bin so that the printed sheets can be prevented from being mixedly stored within one bin.

Third Embodiment

In the third embodiment, as a construction in addition to the construction of the above-described first embodiment, in a case where all the bins are exclusively used based on print jobs in correspondence with the discharge destination identifiers 302 of the discharge portion control information 113, and the discharge destination identifier 210 included in a new print job cannot be assigned to any of the bins of the printing apparatus 100, the host computer 130 which issued the new print job is notified that the bins are unavailable.

Figure 8:
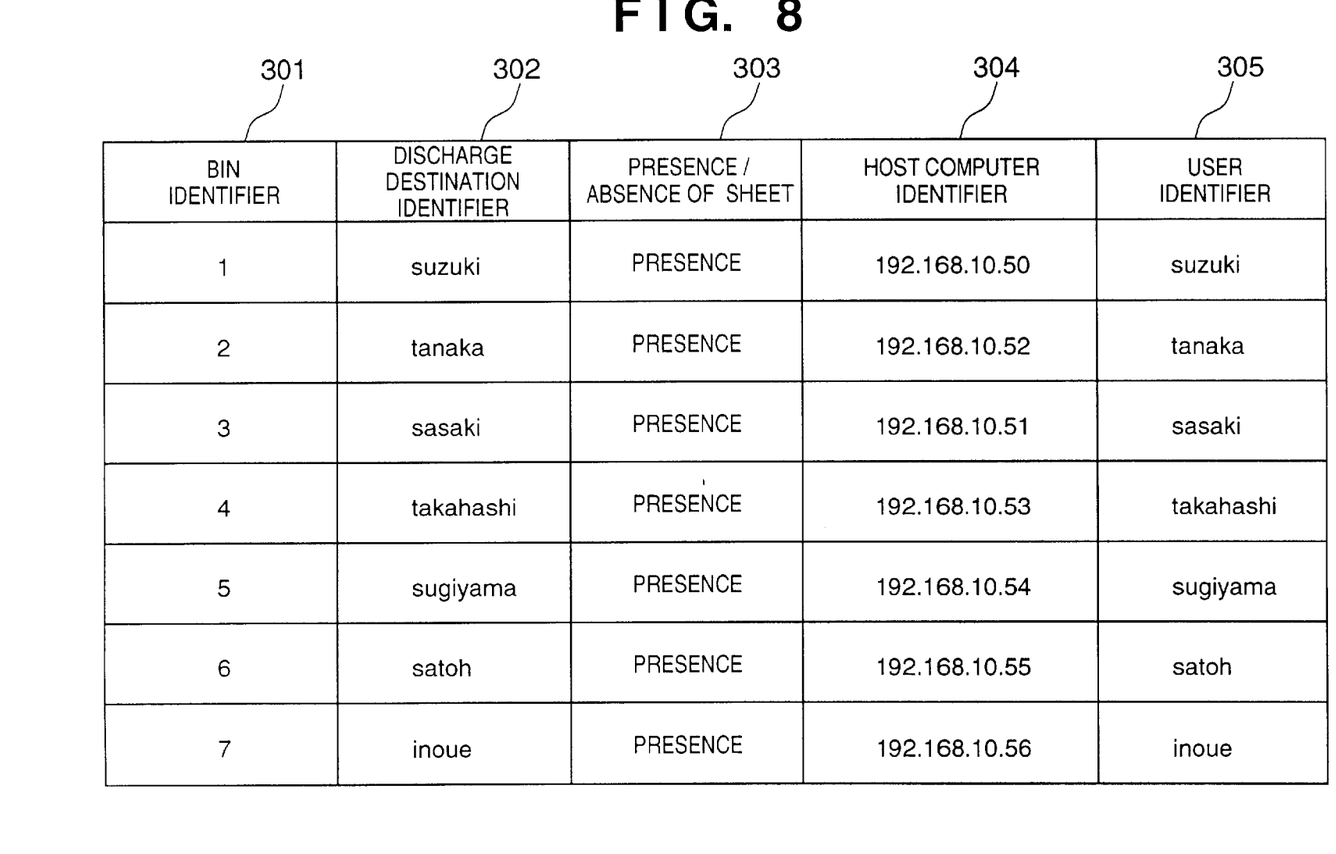
FIG. 8 is a diagram showing an example of the discharge portion control information according to a third embodiment.

FIG. 8 shows an example of the discharge portion control information 113 where the information 303 of presence/absence of sheet is "presence" in all the bins, indicating no available bin exists.

Figure 9:
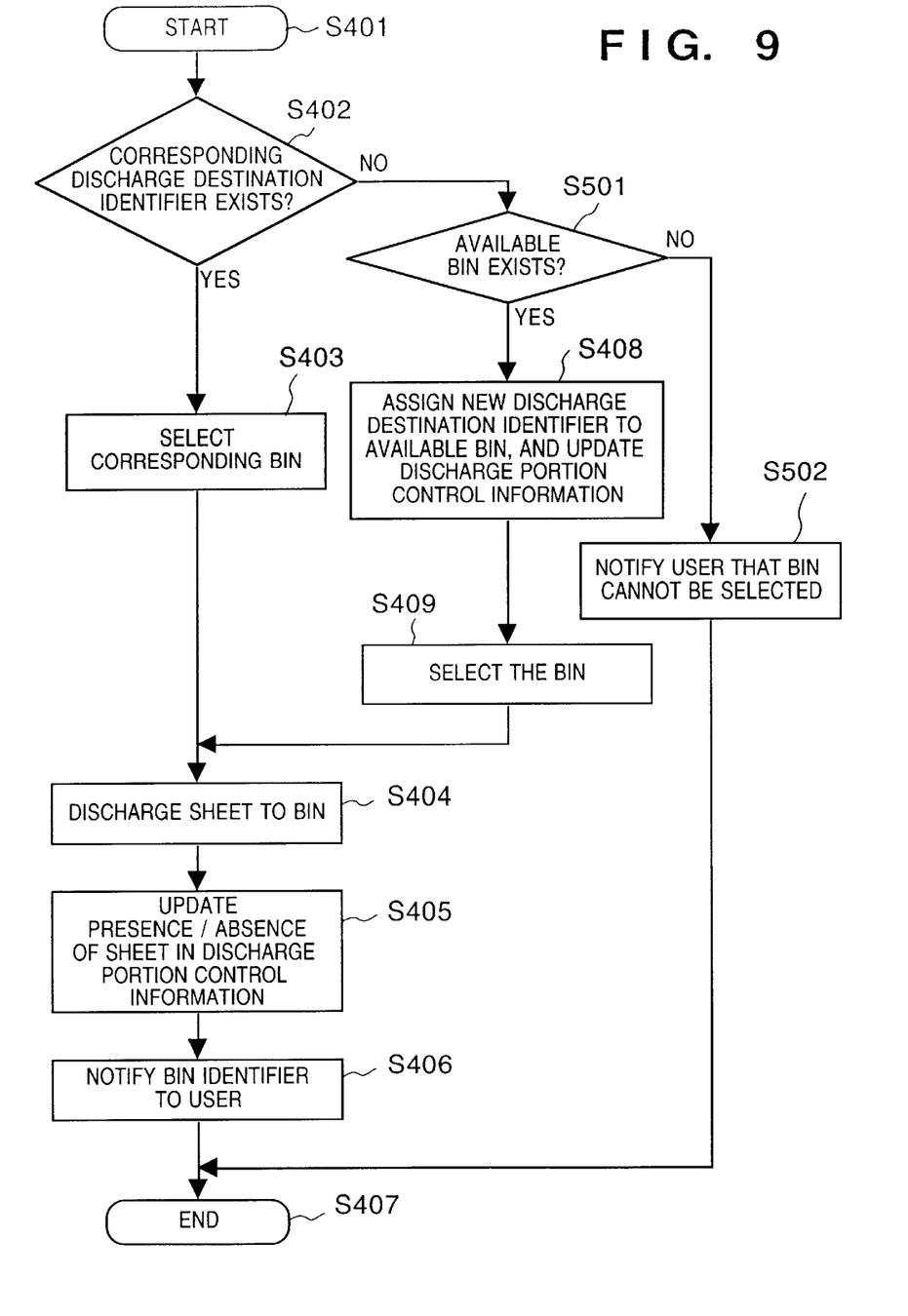
FIG. 9 is a flowchart showing the discharge portion selection procedure in the printing apparatus according to the third embodiment.

FIG. 9 is a flowchart showing processing in this case according to the third embodiment. Note that in FIG. 9, steps corresponding to those in FIG. 4 have the same numerals and explanations of those steps will be omitted.

In FIG. 9, when a print job where "kaneko" is designated as the discharge destination identifier 210 of a print job sent from the host computer 130, first, at step S401, the bin selection processing is started. Then at step S402, since the discharge portion control information 113 in FIG. 8 has no discharge destination identifier corresponding to the discharge destination identifier 210, the process proceeds to step S501, at which it is determined whether or not any available bin exists in the discharge unit 111. As shown in FIG. 8, since no available bin exists, the process proceeds to step S502, at which a user (the host computer 130) that issued the print job is notified that any bin for discharging a printed sheets cannot be selected. Then the process proceeds at step S407 and ends.

Figure 10:
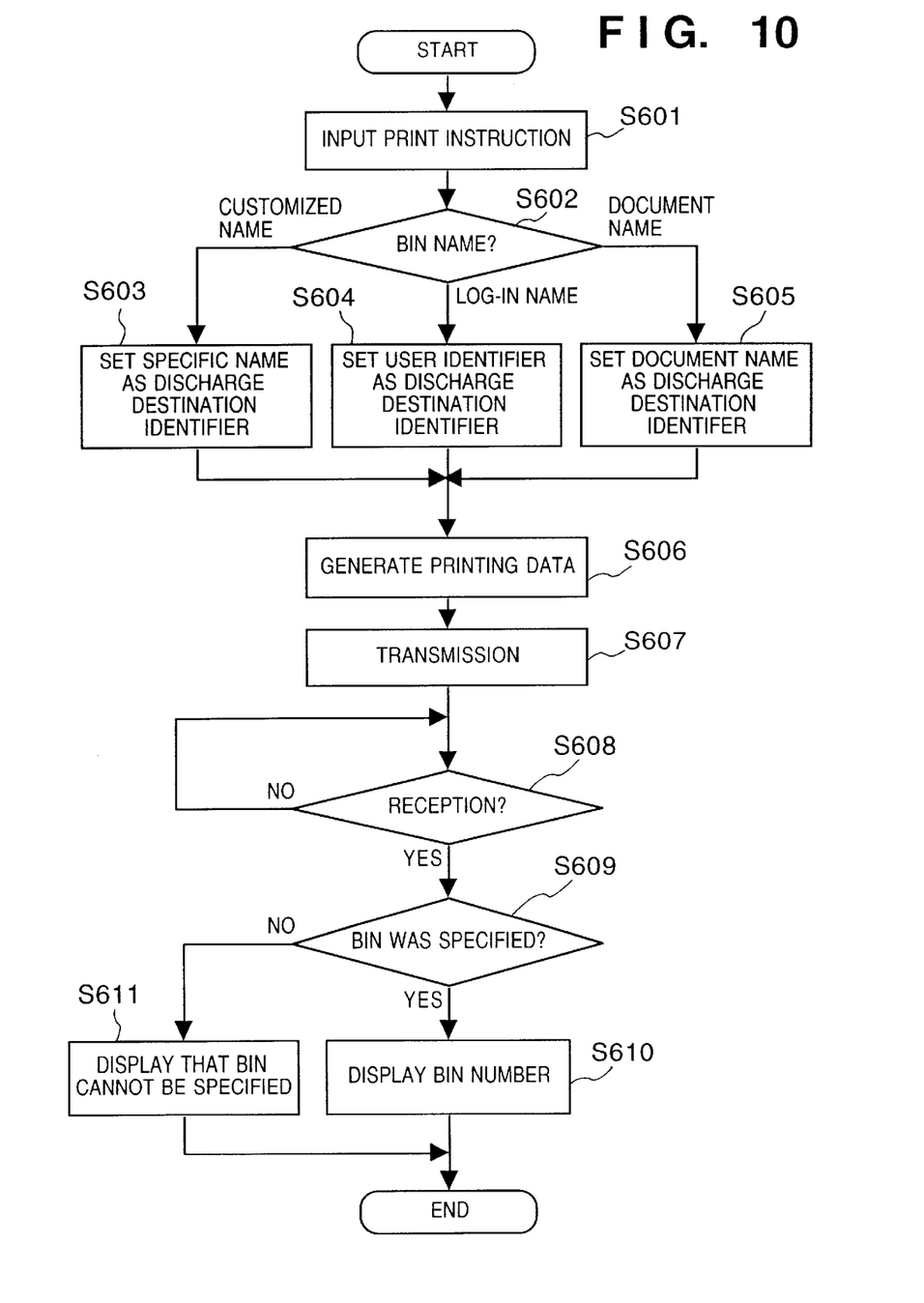
FIG. 10 is a flowchart showing processing by a printer driver of the host computer according to the third embodiment.

FIG. 10 is a flowchart showing processing by a printer driver of the host computer 130. The printer driver is loaded on a memory (not shown) of the host computer 130 and executed.

First, at step S601, when it is instructed to print a document or image data, generated by using an application program executed in the host computer 130, with designation of the printing apparatus 100, the process proceeds to step S602. At step S602, designation of bin of the printing apparatus 100 to which printed sheets are discharged is determined from selection in the window as shown in FIG. 6, where bin designation by using any one of log-in name, print document name or customized name is selected. In use of customized name, the process proceeds to step S603 at which the customized name is set in the discharge destination identifier 210 of the print job. In use of log-in name, the process proceeds to step S604 at which the user identifier is set in the discharge destination identifier 210 of the print job. In use of document name, the process proceeds to step S605 at which the document name as the object of printing is set in the discharge destination identifier 210 of the print job.

In this manner, the discharge destination identifier 210 of the print job is set, then the other identifiers, print data and the like are set in accordance with the data format as shown in FIG. 2, thus the data of the print job is generated, and transmitted to the printing apparatus 100 at step S607. The printing apparatus 100 performs the processing in the flowchart of FIG. 4 or that in FIG. 9.

Next, the process proceeds to step S608 at which reception of information sent from the printing apparatus 100 is waited. When the information has been received, the process proceeds to step S609, at which it is determined whether or not a bin to which a sheet printed by the print job is discharged can be specified in the printing apparatus 100. If a bin has been specified, the process proceeds to step S610, at which the bin number of the bin for discharging printed sheets is displayed on a display unit (not shown). On the other hand, if it is determined at step S609 that a bin has not been specified, the process proceeds to step S611, at which a message, informing that a bin to which a sheet printed by the print job is discharged cannot be specified in the printing apparatus 100, is displayed on the display unit of the host computer 130.

As described above, according to the present embodiment, the following advantages can be obtained. (1) Even in a case where a discharge destination identifier specified by a print job does not exist, a bin where no printed sheet is discharged is specified as a bin for discharging a printed sheet and the printed sheet can be discharged to the specified bin. (2) Further, since the host computer is notified of a bin to which a printed sheet by print job from the host computer is discharged, the user of the host computer can be prevented from picking up a printed sheet of another user from a different bin by mistake. (3) Further, as the host computer is notified of the discharge portion information of the printing apparatus, the user of the host computer can be advised not to picking up a printed sheet of another user from another bin by mistake. (4) Further, as the host computer is notified of the discharge portion information of the printing apparatus, the user can quickly remove the printed sheets from the bin assigned to the user.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing software program code for performing the functions of the aforesaid embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

Further, the above embodiments have been described independently, however, this does not pose any limitation on the present invention. The construction of each embodiment may be arbitrarily combined with the other embodiment(s) and implemented.

The present invention is not limited to the above embodiments and various changes and modifications can be made within the spirit and scope of the present invention. Therefore, to apprise the public of the scope of the present invention, the following claims are made.

What is claimed is:

1. An apparatus having a plurality of discharge portions for discharging a printed medium to one of the plurality of discharge portions, said apparatus comprising:

a receiving unit configured to receive information including at least one of first information and second information from an external device, wherein the first information specifies a discharge destination, and wherein the second information specifies the external device, which sent the information;

an assigning unit configured to assign the discharge destination specified by the first information to a discharge portion, to which a non-discharge destination is assigned, of the plurality of discharge portions;

a selecting unit configured to select a discharge portion to which a discharge destination specified by a print job from an external device is assigned, in a case where the discharge portion to which the discharge destination specified by the print job is assigned does exist, and to select a discharge portion to which non-discharge destination is assigned in a case where the discharge portion to which the discharge destination specified by the print job is assigned does not exist; and a transmitting unit configured to notify the external device specified by the second information, of the discharge portion selected by said selecting unit.

2. An apparatus according to according to claim 1, wherein the first information and the second information are included in data from the external device.

3. An apparatus according to claim 1, further comprising a printing unit configured to print an image on a print medium in accordance with the print job sent from the external device, wherein the first information and the second information are included in the print job.

4. An apparatus according to claim 1, further comprising a printing unit configured to print an image on a print medium in accordance with the print job sent from the external device, wherein the first information is included in the print job and the second information is received by said receiving unit regardless of the print job.

5. An apparatus according to claim 1, wherein said assigning unit initializes an assignment of a discharge destination to a discharge portion in a case where all printed mediums discharged in the discharge portion have been removed.

6. An apparatus according to claim 1, wherein said assigning unit configured to search for a discharge portion to which non-discharge destination is assigned and to assign the discharge destination to the searched discharge portion, said apparatus further comprising a notifying unit configured to notify the external device of that none of the plurality of discharge portions is available, in a case where said assigning unit cannot search a discharge portion to which a non-discharge destination is assigned.

7. An apparatus according to claim 1, wherein the first information indicates a user name of the external device.

8. A system connecting an external device and an apparatus, which has a plurality of discharge portions for discharging a printed medium and discharges a printed medium to one of the plurality of discharge portions, comprising:

a receiving unit configured to receive information including at least one of first information and second information from the external device, wherein the first information specifies a discharge destination, and wherein the second information specifies the external device, which sent the information;

an assigning unit configured to assign the discharge destination specified by the first information to a discharge portion, to which non-discharge destination is assigned, of the plurality of discharge portions;

a selecting unit configured to select a discharge portion to which a discharge destination specified by a print job from an external device is assigned, in a case where the discharge portion to which the discharge destination specified by the print job is assigned does exist, and to select a discharge portion to which non-discharge destination is assigned, in a case where the discharge portion to which the discharge destination specified by the print job is assigned does not exist; and a transmitting unit configured to notify the external device specified by the second information, of the discharge portion selected by said selecting unit.

9. A system according to claim 8, wherein the first information and the second information are included in data from the external device.

10. A system according to claim 8, further comprising a printing unit configured to print an image on a print medium in accordance with the print job sent from the external device, wherein the first information and the second information are included in the print job.

11. A system according to claim 8, further comprising a printing unit configured to print an image on a print medium in accordance with the print job sent from the external device, wherein the first information is included in the print job and the second information is received by said receiving unit regardless of the print job.

12. A system according to claim 8, wherein said assigning unit initializes an assignment of a discharge destination to a discharge portion in a case where all printed mediums discharged in the discharge portion have been removed.

13. A system according to claim 8, wherein said assigning unit configured to search for a discharge portion to which non-discharge destination is assigned and to assign the discharge destination to the searched discharge portion; said apparatus further comprising a notifying unit configured to notify the external device of that none of the plurality of discharge portions is available, in a case where said assigning unit cannot search a discharge portion to which a non-discharge destination is assigned.

14. A system according to claim 8, wherein the first information indicates a user name of the external device.

15. A method of discharging a printed medium to a discharge portion, comprising:

a receiving step of receiving information including at least one of first information and second information from an external device, which requires to discharge a printed medium, wherein the first information specifies a discharge destination of a printed medium, and wherein the second information specifies the external device, which sent the information;

an assigning step of assigning the discharge destination specified by the first information to a discharge portion, to which non-discharge destination is assigned, of the plurality of discharge portions;

a selecting step of selecting a discharge portion to which a discharge destination specified by a print job from an external device is assigned in a case where the discharge portion to which the discharge destination specified by the print job is assigned does exist, and selecting a discharge portion to which non-discharge destination is assigned in a case where the discharge portion to which the discharge destination specified by the print job is assigned does not exist; and a notifying step of notifying the external device specified by the second information, of the discharge portion selected in said selecting step.

16. A method according to claim 15, wherein the first information and the second information are included in data received in said receiving step.

17. A method according to claim 15, wherein the first information is received regardless of the second information in said receiving step.

18. A method according to claim 15, further comprising an initializing step of initializing an assignment of a discharge destination to the discharge portion assigned in said assigning step in a case where all printed mediums discharged in the discharge portion have been removed.

19. A method according to claim 15, wherein in said assigning step, a discharge portion to which non-discharge destination is assigned is searched and the discharge destination is assigned to the searched discharge portion; and further comprising a notifying step of notifying the external device of that none of the plurality of discharge portions is available in a case where all discharge portions are available in a case where all discharge portions are assigned in said assigning step.

20. A method according to claim 15, wherein the first information indicates a user name of the external device.

* * * * *

UNITED STATES PATENT AND TRADEMARK OFFICE
CERTIFICATE OF CORRECTION

PATENT NO.     : 6,781,708 B1
DATED          : August 24, 2004
INVENTOR(S)    : Katsuhiro Wada It is certified that error appears in the above-identified patent and that said Letters Patent is hereby corrected as shown below:

Column 5,
Line 4, "is occurred" should read -- is occasioned --.

Column 9,
Line 1, "sheets" should read -- sheet --;
Line 2, "at" should read -- to --;
Line 32, "waited." should read -- awaited: --; and
Line 58, "picking" should read -- pick --.

Column 10,
Line 63, "according to" (second occurrence) should be deleted.

Column 11,
Line 20, "of" (first occurrence) should be deleted.

Column 12,
Lines 10 and 60, "of" (first occurrence) should be deleted.

Signed and Sealed this

Twenty-third Day of November, 2004

JON W. DUDAS
*Director of the United States Patent and Trademark Office*